US005519872A

United States Patent [19]
Khandekar et al.

[11] Patent Number: 5,519,872
[45] Date of Patent: May 21, 1996

[54] FAST ADDRESS LATCH WITH AUTOMATIC ADDRESS INCREMENTING

[75] Inventors: Narendra Khandekar; Dahmane Dahmani; Jasmin Ajanovic, all of Folsom, Calif.

[73] Assignee: Intel Corporation, Santa Clara, Calif.

[21] Appl. No.: 175,589

[22] Filed: Dec. 30, 1993

[51] Int. Cl.⁶ ................................................. G06F 13/364
[52] U.S. Cl. ........................... 395/775; 395/310; 395/403
[58] Field of Search ................................. 395/775, 325, 395/309, 310, 403

[56] References Cited

U.S. PATENT DOCUMENTS

| 4,107,786 | 8/1978 | Masaki et al. | 345/130 |
|---|---|---|---|
| 4,112,490 | 9/1978 | Pohlman et al. | 395/287 |
| 4,438,492 | 3/1984 | Harmon, Jr. et al. | 395/375 |
| 4,926,312 | 5/1990 | Nukiyama | 395/375 |
| 5,014,188 | 5/1991 | Kawamura | 395/403 |
| 5,157,776 | 10/1992 | Foster | 395/425 |
| 5,235,545 | 8/1993 | McLaury | 365/189.04 |
| 5,253,348 | 10/1993 | Scalise | 395/325 |
| 5,287,481 | 2/1994 | Lin | 395/425 |
| 5,333,293 | 7/1994 | Bonella | 395/425 |
| 5,375,079 | 12/1994 | Uramoto et al. | 364/736 |
| 5,379,384 | 1/1995 | Solomon | 395/325 |
| 5,388,133 | 2/1995 | Vijen et al. | 372/13 |
| 5,450,460 | 9/1995 | Stodieck | 377/44 |

Primary Examiner—Jack B. Harvey
Assistant Examiner—Paul R. Myers
Attorney, Agent, or Firm—Blakely, Sokoloff, Taylor & Zafman

[57] ABSTRACT

A latching mechanism captures an address transmitted on a multiplexed address/data bus and preserves it for the full bus cycle. A transparent latch with a multiplexed feedback path allows the address to be quickly captured and decoded. An additional multiplexer and latch cooperate with the first mentioned latch to keep the address stable for a sufficient time to allow latching by slower memory elements. Additional elements are provided to automatically increment the address for multiple data burst operation.

8 Claims, 3 Drawing Sheets

FAST ADDRESS LATCH WITH AUTOMATIC ADDRESS INCREMENTING

BACKGROUND OF THE INVENTION

1. Field of the Invention

This invention relates generally to the field of data processing systems, and particularly to an apparatus for latching an address from a multiplexed address/data bus and automatically incrementing the address.

2. Background Art

Most present day personal and workstation computers are organized as shown in FIG. 1. A central processing unit (CPU) 10 is coupled to a local CPU bus 12 as is the main memory 14. A cache memory 16 may also be coupled to bus 12. Communication with peripheral devices 22 is accomplished over an expansion bus 20 coupled to I/O port 18. A number of expansion bus standards have been developed. One such standard is the industry standard architecture (ISA) bus that is widely used in personal computer systems. More recently, the extended ISA (EISA) bus has been developed. This is a superset of the ISA bus that includes all ISA bus features, together with extensions to enhance system performance and capabilities. Both the ISA bus and EISA bus have relatively narrow bandwidths in comparison to the bandwidth available on local busses for state-of-the-art high performance CPUs. This results in I/O bottlenecks and limits the ability of the system to service high performance peripherals such as local area network (LAN), SCSI, graphics and video.

In order to deal with the inherent limitations of earlier generation expansion bus standards, a new bus standard designated the "Peripheral Component Interconnect" (PCI) bus has been developed. PCI is a fast local bus particularly adapted for servicing high performance peripheral units. A typical system employing a PCI bus is illustrated in FIG. 2. A PCI/cache memory controller (PCMC) 30 provides a bridge between the host CPU 10 and the PCI bus 32. The PCMC integrates the cache and main memory DRAM control function and provides the bus control for transfers between the CPU 10, cache 16, main memory 14 and the PCI bus. The PCMC is used in conjunction with a local bus accelerator (LBX) 31 which provides the host to PCI address path and data paths between the CPU/cache, main memory and PCI bus. The LBX also contains posted write buffers and read-prefetch buffers. Together, the PCMC and LBX provide a full function data path to main memory and form a PCI bridge to the host subsystem (CPU/cache).

During PCI-to-main memory cycles, the PCMC/LBX acts as a target on the PCI bus, allowing PCI masters to read from and write to main memory. During CPU cycles, the PCMC acts as a PCI master. The CPU can then read and write I/O, memory and configuration spaces on the PCI. The PCI bus operates in a multiplexed, burst mode, with transfers comprising an address phase followed by multiple data word phases.

PCI-to-main memory cycles invoke a main memory chip select (MEMCS#) signal. When asserted, MEMCS# indicates to the PCMC that a PCI master cycle is targeting main memory. MEMCS# is generated by the PCEB (described below) and is sent to the PCMC on a dedicated line.

In order to maintain system compatibility with peripheral units designed to operate with earlier generation ISA/EISA expansion busses, a PCI/expansion bus bridge unit 40 is coupled between the PCI bus and the ISA or EISA expansion bus 20. A system such as shown in FIG. 2 is thus able to take advantage of the increased performance capabilities of the PCI bus while maintaining access to the large existing base of ISA and EISA expansion cards and their corresponding software applications.

The PCI bus is particularly designed to address the growing need for a standardized local bus that is not directly dependent on the speed and size of the CPU bus. New generations of personal computer system software with sophisticated graphical interfaces, multi-tasking and multi-threading bring new requirements that traditional PC input/output architectures cannot satisfy. As indicated in FIG. 2, the input/output functions of the system are decoupled from the processor and memory assets, thereby enabling the input/output design of the system to remain stable over multiple generations of processor and/or memory technology. Regardless of new requirements or technology applied on the CPU side of the host bridge, the PCI side may remain unchanged, which allows re-usability of not only the remainder of the platform chip set, including the PCI/expansion bus bridge, but also all of the other I/O functions interfaced at both the PCI and expansion bus levels.

The PCI/expansion bus bridge unit 40 integrates several bus functions on both the PCI and expansion busses. For the PCI local bus, the functions include PCI local bus arbitration and default bus driver. In the case of an EISA expansion bus, the central functions include the EISA bus controller, EISA arbiter and EISA data swap logic. The PCI/EISA bridge also integrates system functions, including PCI parity and system error reporting, buffer coherency management protocol, PCI and EISA memory and I/O address mapping and decoding. For maximum flexibility, all of these functions are programmable, thereby allowing for a variety of optional features. A particular PCI/EISA bridge set has been developed for the Intel Pentium™ processor. This chip set is illustrated in FIG. 3 and comprises a PCI/EISA bridge (PCEB) and a EISA system component (ESC). These two components work in tandem to provide an EISA I/O sub-system interface for personal computer platforms based on the Pentium™ processor chip and PCI bus standard. A corresponding chip set for the PCMC/LBX has also been developed for the Pentium™ processor.

The hierarchy of the CPU bus as the execution bus, PCI local bus as a primary I/O bus and EISA bus as a secondary I/O bus allows concurrency for simultaneous operations in all three bus environments. Data buffering permits concurrency for operations that cross over from one bus environment to another. For example, a PCI device may post data into the PCEB, permitting the PCI local bus transaction to complete in a minimum time and freeing up the PCI local bus for further transactions. The PCI device need not wait for the transfer to complete to its final destination. Meanwhile, any ongoing EISA bus transactions are permitted to complete. The posted data will then be transferred to its EISA bus destination when the EISA bus is available. The PCEB-ESC chip set implements extensive buffering for PCI-to-EISA and EISA-to-PCI bus transactions. In addition to concurrency for the operation of the cross-bus environments, data buffering allows advantage to be taken of the fastest operations within a particular bus environment via PCI burst transfers and EISA burst transfers.

The PCI local bus with 132 MByte/second and EISA with 33 MByte/second peak data transfer rates represent bus environments with significantly different bandwidths. Without buffering, transfers that cross between bus environments would be performed at the speed of the slower bus. Data buffers provide a mechanism for data rate adoption so that the usable bandwidth of the fast bus environment (PCI) is not significantly impacted by the slower bus environment (EISA).

The PCEB can be either a master or slave on the PCI local bus and it is optimized for bus frequencies from 25 megahertz to 33 megahertz. For PCI-initiated transfers, the PCEB functions only as a slave. For EISA-initiated transfers to the PCI local bus, the PCEB is a PCI master. The PCEB contains a fully EISA-compatible master and slave interface. The PCEB directly drives eight EISA slots without external data or address buffering. The PCEB functions as a master or slave on the EISA bus only for transfers between the EISA bus and PCI local bus. For transfers confined to the EISA bus, the PCEB functions neither as a master nor slave. However, the data swap logic contained in the PCEB is involved in such transfers if data size translation is required.

The ESC implements system functions, such as timer/counter, DMA, and interrupt controller. The ESC also implements EISA sub-system control functions, such as EISA bus controller and EISA bus arbiter.

SUMMARY OF THE INVENTION

The present invention provides a latching mechanism for capturing an address transmitted on the PCI bus and preserving it for a full PCI clock cycle. A transparent latch with a multiplexed feedback path allows the address to be quickly captured and decoded. An additional multiplexer and latch cooperate with the first mentioned latch to keep the address stable for a sufficient time to allow latching by slower memory elements. Additional elements are provided to automatically increment the address for multiple data burst operation.

Several advantages are realized with the present invention. The circuit permits addresses to be quickly decoded so that point to point signals can be generated one clock sooner, thereby saving valuable PCI bandwidth. Secondly, the latching mechanism allows circuitry driven by the PCI address to be designed independent of the PCI specifications and to be implemented with slower and less costly memory elements. Thirdly, the present invention provides a mechanism for internally generating the address corresponding to any data phase, providing a greater flexibility in designing parallelism into the PCI-expansion bus bridge.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, devices and circuits are omitted so as to not obscure the description of the present invention with unnecessary detail.

Because the PCI bus has a high speed, multiplexed architecture, the address carried during the address phase must be decoded as fast as possible (in accordance with PCI specifications, the address is available for only seven nanoseconds). Furthermore, the address must be kept stable long enough to allow latching by slower memory elements and must be incremented between the succeeding serial bursts of data. The present invention accomplishes these objectives with a circuit that quickly decodes and automatically increments an address carried on the PCI bus.

Figure 1:
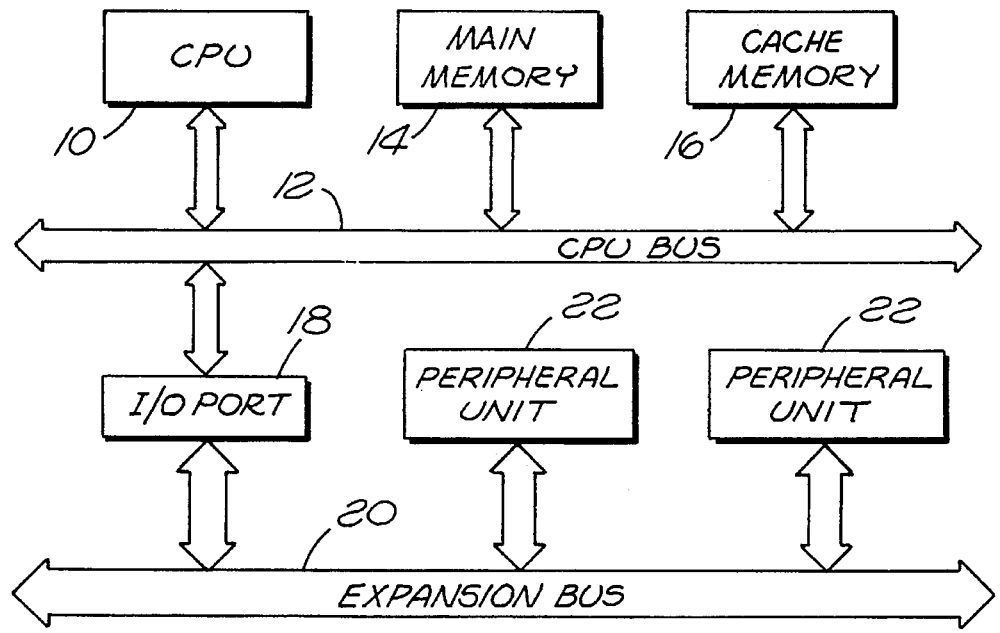
FIG. 1 is a simplified block diagram of a prior art computer system.
Figure 2:
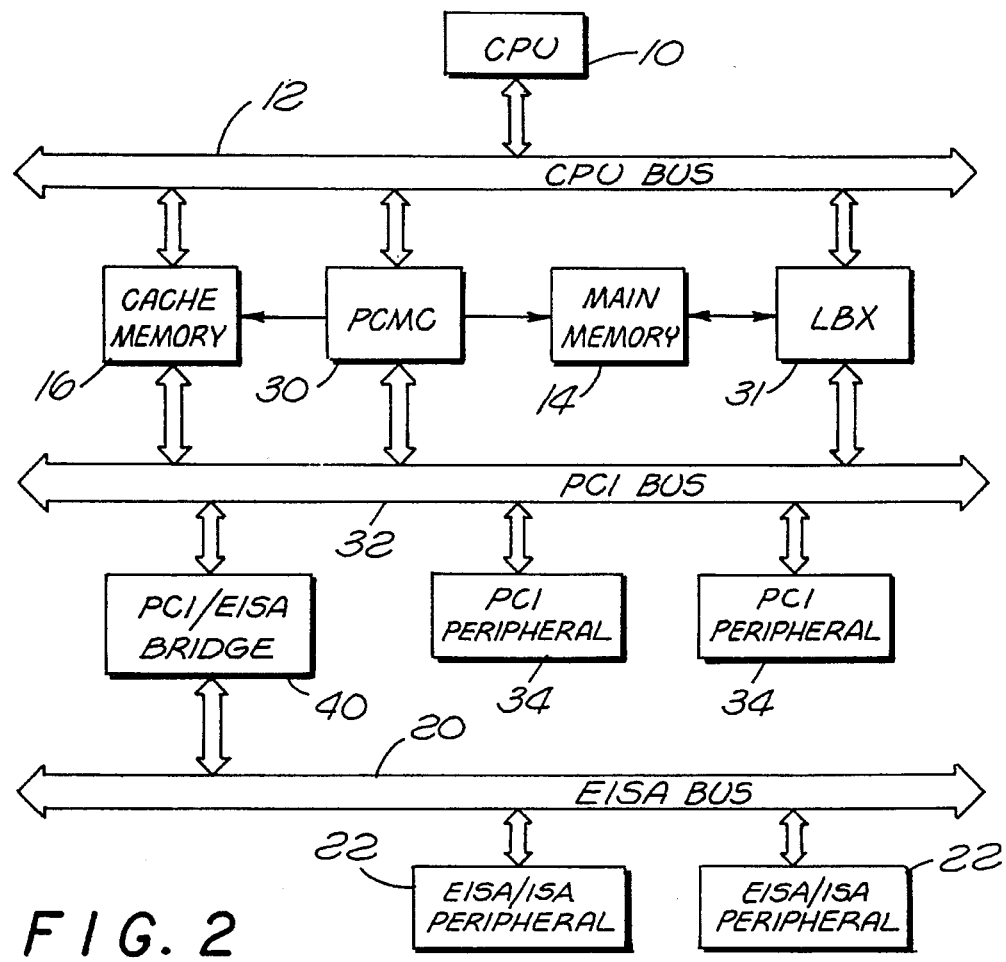
FIG. 2 is a simplified block diagram of a prior art computer system incorporating a peripheral component interconnect (PCI) bus.
Figure 3:
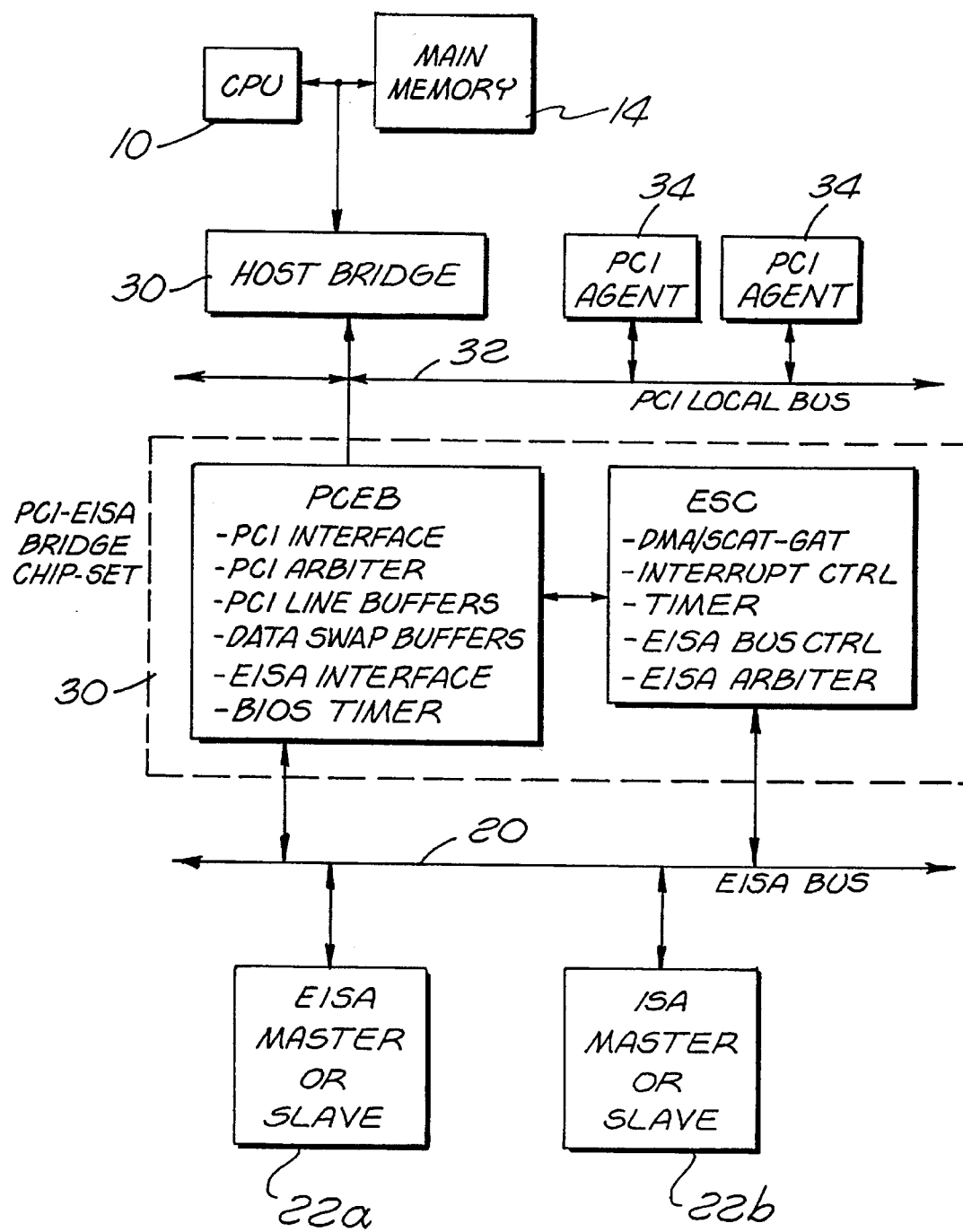
FIG. 3 is a simplified block diagram of a PCI/expansion bus bridge in which the present invention may be incorporated.
Figure 4:
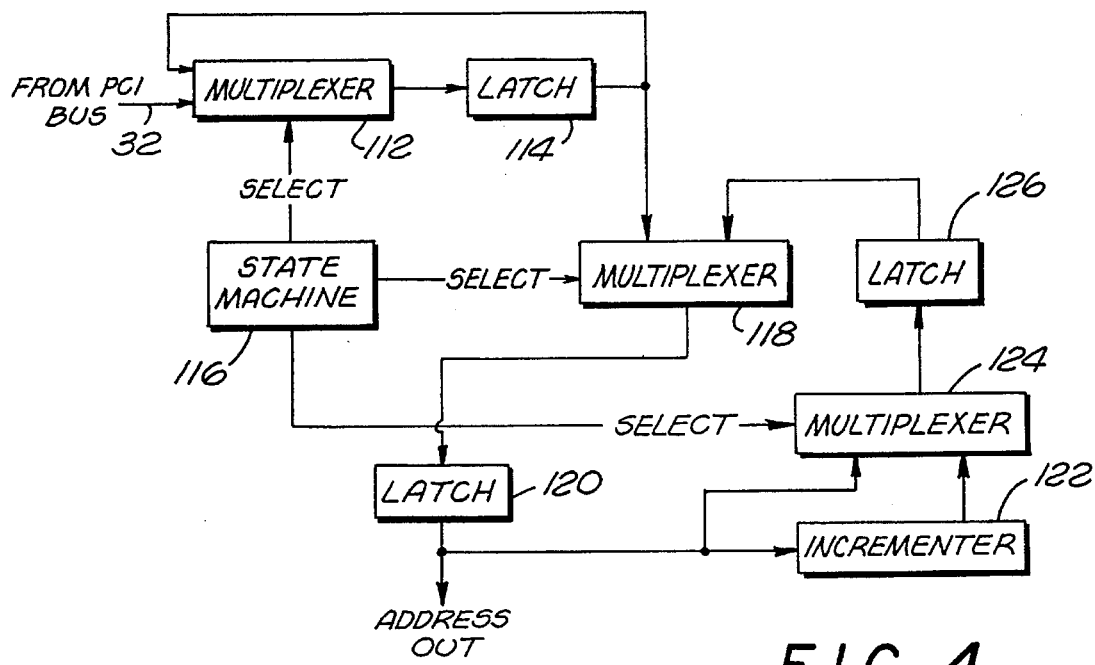
FIG. 4 is a block diagram of a latching/incrementing circuit according to the present invention.

With reference to FIG. 4, the PCI bus 32 is coupled to one of the input ports of multiplexer 112. The output of multiplexer 112 is asserted at the input of transparent latch 114. The output of latch 114 is fed back to the second input port of multiplexer 112. Latch 114 is active on the low half-cycle of the PCI clock. The combination of multiplexer 112 and latch 114 provide a latching mechanism for preserving the address for the duration of the cycle. The SELECT input for multiplexer 112 is controlled by state machine 116 which switches to the feedback path as soon as a cycle starts on the PCI bus and keeps that path activated until the cycle finishes. The delay introduced by multiplexer 112 also helps to compensate for the internal clock skew with respect to the external PCI clock. This is necessary in order to meet the hold time requirements for latch 114 since the PCI specification specifies a hold time of zero nanoseconds. The latching mechanism of multiplexer 112 and latch 114 enables the PCEB to perform combinational decoding, which is necessary to quickly decode the address for point to point signals such as MEMCS#.

As mentioned above, it is necessary to keep the address stable for a minimum of one clock cycle to permit latching by slow memory elements. This is accomplished by the combination of latch 114, multiplexer 118 and latch 120. The output of latch 114 is coupled to one of the input ports of multiplexer 118, the output of which is coupled to the input of latch 120. Latch 120 is active during the high half-cycle of the PCI clock. Latches 114 and 120 in tandem act like a flip-flop and ensure a stable address at the output of latch 120 for a minimum duration of one PCI clock cycle.

The PCEB internally increments the PCI address with incrementer 122, multiplexer 124 and latch 126. The output of latch 120 is coupled both to the input of incrementer 122 and one of the input ports of multiplexer 124. The output of incrementer 122, which simply adds one to the address value presented at the input, is coupled to the other input port of multiplexer 124. The SELECT input for multiplexer 124 is controlled by state machine 116 that chooses between the two inputs depending on the type of cycle. During a Write cycle, the data bursts immediately follow the address phase and the output of incrementer 122 is selected. During a Read cycle, data is not available on the PCI bus until after the memory access is completed and the output from latch 120 is selected as the active input to multiplexer 124.

Latch 126 is active during the low half-cycle of the PCI clock and receives the output of multiplexer 124. The output of latch 126 is provided to multiplexer 118 and prevents the incremented address from affecting the previous address until the next clock cycle. This is necessary to ensure reliable latching by slow memory elements.

Figure 5:
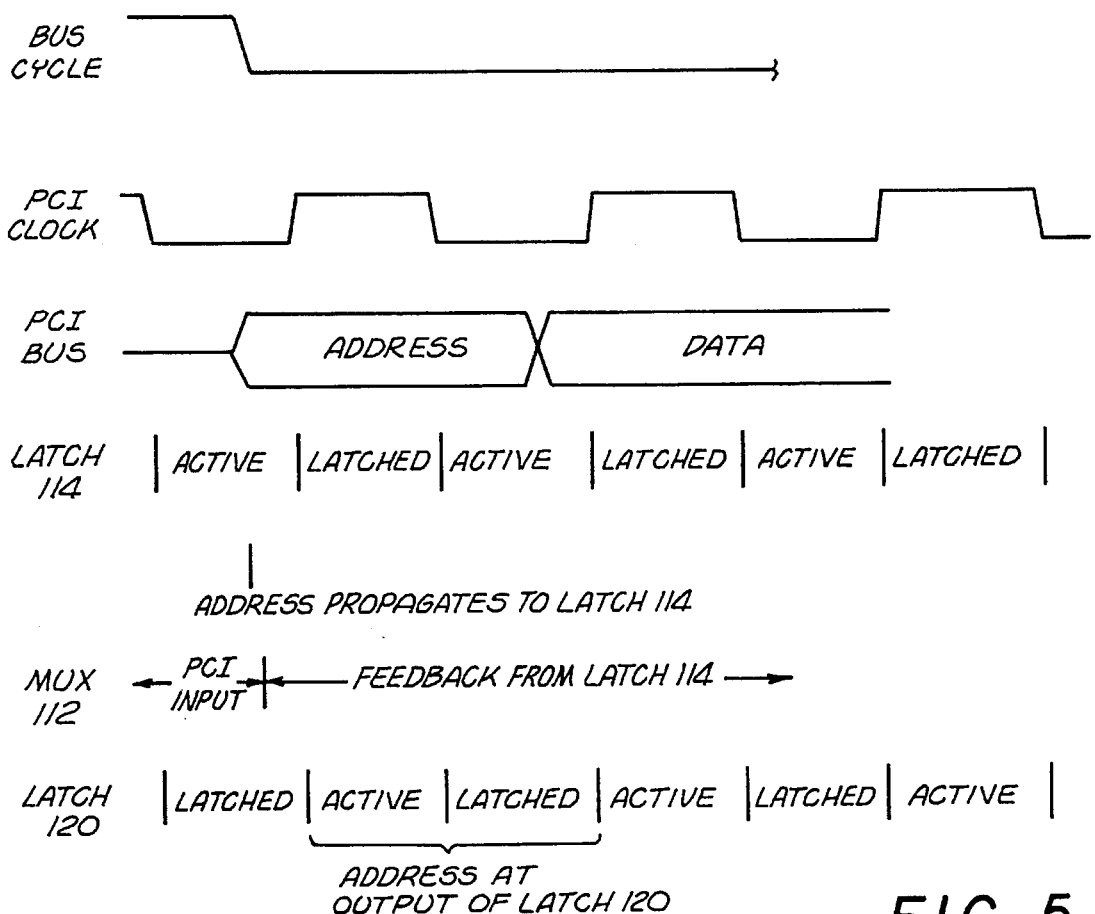
FIG. 5 is a timing diagram illustrating the operation of the circuit of FIG. 4.

FIG. 5 illustrates the operation of multiplexer 112 and latches 114, 120 at the start of a bus cycle. The address from the PCI bus is immediately circulated through latch 114 and the feedback path of multiplexer 112 is then selected to latch the address, even while latch 114 is still active. The address propagates to latch 120 where it is held for a full cylcle of the PCI clock.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An address capture circuit comprising:
   (a) a first multiplexer having a first input coupled to a communications bus, said bus carrying an address during an address phase, a second input and an output;
   (b) a first latch having an input coupled to the output of the first multiplexer and an output coupled to the second input of the first multiplexer;
   (c) a second multiplexer having a first input coupled to the output of the first latch, a second input and an output;
   (d) a second latch having an input coupled to the output of the second multiplexer and an output providing the address captured by said address capture circuit;
   (e) an incrementer having an input coupled to the output of the second latch and an output, wherein the output of the incrementer is a digital word having a value equal to a digital word presented at the input of the incrementer incremented by a predetermined quantity;
   (f) a third multiplexer having a first input coupled to the output of the incrementer, a second input coupled to the output of the second latch and an output;
   (g) a third latch having an input coupled to the output of the third multiplexer and an output coupled to the second input of the second multiplexer;
   (h) control means for selecting the second input of the first multiplexer during a bus cycle of the communications bus and for selecting the input of the second and third multiplexer as a function of a bus cycle type.

2. The circuit of claim 1 wherein the control means comprises a state machine.

3. The circuit of claim 1 wherein the communications bus is a Peripheral Component Interconnect (PCI) bus.

4. The circuit of claim 1 wherein the control means selects the first input of the third multiplexer when the bus cycle type is a write cycle.

5. The circuit of claim 1 wherein the control means selects the second input of the third multiplexer when the bus cycle type is a read cycle.

6. A data processing system comprising:
   a central processing unit;
   a first communications bus;
   a host bridge coupling the central processing unit to the communications bus;
   a second communications bus;
   an interbus bridge coupling the first and second communications busses, said interbus bridge including an address capture circuit comprising:
   (a) a first multiplexer having a first input coupled to a communications bus, said bus carrying an address during an address phase, a second input and an output;
   (b) a first latch having an input coupled to the output of the first multiplexer and an output coupled to the second input of the first multiplexer;
   (c) a second multiplexer having a first input coupled to the output of the first latch, a second input and an output;
   (d) a second latch having an input coupled to the output of the second multiplexer and an output providing the address captured by said address capture circuit;
   (e) an incrementer having an input coupled to the output of the second latch and an output, wherein the output of the incrementer is a digital word having a value equal to a digital word presented at the input of the incrementer incremented by a predetermined quantity;
   (f) a third multiplexer having a first input coupled to the output of the incrementer, a second input coupled to the output of the second latch and an output;
   (g) a third latch having an input coupled to the output of the third multiplexer and an output coupled to the second input of the second multiplexer;
   (h) control means for selecting the second input of the first multiplexer during a bus cycle of the communications bus and for selecting the input of the second and third multiplexer as a function of a bus cycle type.

7. The data processing system of claim 6 wherein the first communications bus is a Peripheral Component Interconnect (PCI) bus.

8. The data processing system of claim 6 wherein the second communications bus is an Extended Industry Standard Architecture (EISA) bus.

* * * * *